US009897883B2

(12) United States Patent
Kim et al.

(10) Patent No.: US 9,897,883 B2
(45) Date of Patent: Feb. 20, 2018

(54) LIQUID CRYSTAL DISPLAY

(71) Applicant: SAMSUNG DISPLAY CO., LTD., Yongin-si, Gyeonggi-do (KR)

(72) Inventors: Dong Wook Kim, Seoul (KR); Yang Hee Kim, Yongin-si (KR); Jong Hwan Park, Gimhae-si (KR); Yeon Ju Seo, Yongin-si (KR); Do Hyun Jung, Suwon-si (KR); Sung Jin Hong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 90 days.

(21) Appl. No.: 14/987,633

(22) Filed: Jan. 4, 2016

(65) Prior Publication Data

US 2016/0370622 A1 Dec. 22, 2016

(30) Foreign Application Priority Data

Jun. 16, 2015 (KR) .......................... 10-2015-0084920

(51) Int. Cl.
*G02F 1/1335* (2006.01)
*G02F 1/1368* (2006.01)
(Continued)

(52) U.S. Cl.
CPC ........ *G02F 1/1368* (2013.01); *G02F 1/13471* (2013.01); *G02F 1/134363* (2013.01); *G02F 1/136286* (2013.01); *G09G 3/3648* (2013.01); *G02F 2001/13685* (2013.01); *G02F 2001/136222* (2013.01);
(Continued)

(58) Field of Classification Search
CPC ............. G02F 1/1368; G02F 1/136286; G02F 2001/136222; G02F 2001/13685; G02F 1/13471; G09G 3/3648; G09G 3/3607; G09G 2300/023; G09G 2300/0426
See application file for complete search history.

(56) References Cited

U.S. PATENT DOCUMENTS

2004/0095541 A1* 5/2004 Takeichi ........... G02F 1/134336
349/139
2014/0192302 A1 7/2014 Kim et al.

FOREIGN PATENT DOCUMENTS

KR 1020030025999 3/2003
KR 1020070113397 11/2007
KR 1020080051200 6/2008

* cited by examiner

*Primary Examiner* — Nathanael R Briggs
(74) *Attorney, Agent, or Firm* — F. Chau & Associates, LLC

(57) ABSTRACT

A liquid crystal display includes a first substrate that includes a first switching element and first electric field forming electrodes that form a first electric field based on on/off signals received from the first switching element, a second substrate which faces the first substrate and that includes a second switching element and second electric field forming electrodes that form a second electric field b on/off signals received from the second switching element, and a liquid crystal layer interposed between the first substrate and the second substrate, wherein the liquid crystal layer includes a first electric field area controlled by the first substrate in which the first electric field is formed, and a second electric field area controlled by the second substrate in which the second electric field is formed, and wherein the first electric field area and the second electric field area are arranged side by side.

13 Claims, 7 Drawing Sheets

(51) Int. Cl.
*G02F 1/1362* (2006.01)
*G02F 1/1347* (2006.01)
*G02F 1/1343* (2006.01)
G09G 3/36 (2006.01)

(52) U.S. Cl.
CPC ..... *G09G 3/3607* (2013.01); *G09G 2300/023* (2013.01); *G09G 2300/0426* (2013.01)

LIQUID CRYSTAL DISPLAY

CROSS-REFERENCE TO RELATED APPLICATION

This application claims priority under 35 U.S.C. §119 from, and the benefit of, Korean Patent Application No. 10-2015-0084920, filed on Jun. 16, 2015 in the Korean Intellectual Property Office, the contents of which are herein incorporated by reference in their entirety.

BACKGROUND

1. Technical Field

Embodiments of the present disclosure are directed to a liquid crystal display.

2. Discussion of the Related Art

A liquid crystal display is one of the most widely used flat panel displays. A liquid crystal display is a display device which adjusts the amount of light transmitted by rearranging the liquid crystal molecules in a liquid crystal layer with voltages applied to electrodes.

The liquid crystal display includes a first substrate, a second substrate disposed to face the first substrate and includes a pixel electrode and a switching element connected to the pixel electrode, and a liquid crystal layer interposed between the first substrate and the second substrate.

In a general liquid crystal display, a light blocking member is formed for each pixel to block light leakage and improve a contrast ratio of the liquid crystal display.

Recently, with the development of high-resolution liquid crystal displays, the liquid crystal display is highly integrated as the size of each pixel is reduced. Thus, a light blocking member formed for each pixel is also highly integrated.

Accordingly, an aperture ratio of a liquid crystal display is reduced due to the light blocking member for each pixel, which may degrade image quality.

SUMMARY

Exemplary embodiments of present disclosure can provide a liquid crystal display capable of increasing an aperture ratio to improve image quality by improving a structure of the liquid crystal display.

According to an exemplary embodiment of the disclosure, a liquid crystal display includes a first substrate that includes a first switching element and first electric field forming electrodes that form a first electric field based on on/off signals received from the first switching element, a second substrate which faces the first substrate and that includes a second switching element and second electric field forming electrodes that form a second electric field based on on/off received from the second switching element, and a liquid crystal layer interposed between the first substrate and the second substrate, wherein the liquid crystal layer includes a first electric field area controlled by the first substrate in which the first electric field is formed, and a second electric field area controlled by the second substrate which the second electric field is formed, and wherein the first electric field area and the second electric field area are arranged side by side.

The liquid crystal layer may comprise a first switching area and a first insulating area, wherein the first insulating area corresponds to a first insulating material disposed on the first substrate that extends from the first electric field forming electrodes to the first switching element, and a second switching area and a second insulating area, wherein the second insulating area corresponds to a second insulating material disposed on the second substrate that extends from the second electric field forming electrodes to the second switching element, wherein the first switching area, the first electric field area and the first insulating area are defined by the first substrate, and the second switching area, the second electric field area and the second insulating area are defined by the second substrate.

The first switching area and the second switching area may overlap each other.

The first electric field area may be positioned at one side of the first switching area and the first insulating area may be positioned at the other side of the first switching area, and wherein the second insulating area may be positioned at one side of the second switching area and the second electric field area may be positioned at the other side of the second switching area.

The first electric field area may correspond to the second insulating area and the second electric field area may correspond to the first insulating area, when the first substrate is bonded to the second substrate.

The liquid crystal display further may comprise a light blocking member disposed to in an area corresponding to where the first switching area and the second switching area overlap each other.

The light blocking member may comprise a column spacer that maintains a cell gap between the first substrate and the second substrate and a black matrix formed on one of the first substrate and the second substrate.

The column spacer and the black matrix may be integrally formed.

The liquid crystal display further may comprise a color filter disposed on the first substrate which is one of the first substrate and the second substrate to correspond to the first electric field area and the first insulating area, wherein the first electric field area and the second electric field area may display the same color.

The color filter may be disposed The liquid crystal display further may comprise a first color filter disposed on the first substrate and a second color filter disposed on the second substrate, wherein the the first color filter and the second color filter are disposed to correspond to the first electric field area and the second electric field area, respectively, and the first electric field area and the second electric field area display different colors.

According to an exemplary embodiment of the disclosure, a liquid crystal display comprises a first substrate that forms a first electric field; a second substrate which faces the first substrate and that forms a second electric field; and a liquid crystal layer interposed between the first substrate and the second substrate, wherein the liquid crystal layer includes a first switching area, a first electric field area in which the first electric field is formed, and a first insulating area, and a second switching area, a second electric field area in which the second electric field is formed, and a second insulating area, wherein the first switching area, the first electric field area and the first insulating area are defined by the first substrate, and the second switching area, the second electric field area and the second insulating area are defined by the second substrate, wherein the first electric field area and the second electric field area are arranged side by side.

The first substrate may includes a first switching element, first electric field forming electrodes that forms the first electric field in the first electric field area based on on/off signals received from the first switching element, and a first insulating material that extends from the first electric field forming electrodes to the first switching element and that corresponds to the first insulating area, the second substrate may include a second switching element, second electric field forming electrodes that forms the second electric field in the second electric field area based on on/off signals received from the second switching element, and a second insulating material that extends from the second electric field forming electrodes to the second switching element and that corresponds to the second insulating area.

The first switching area and the second switching area may overlap each other, and the liquid crystal display further include a light blocking member disposed in an area corresponding to where the first switching area and the second switching area overlap each other.

The first electric field area may be positioned at one side of the first switching area and the first insulating area is positioned at the other side of the first switching area, the second insulating area may be positioned at one side of the second switching area and the second electric field area is positioned at the other side of the second switching area, and the first electric field area may correspond to the second insulating area and the second electric field area may correspond to the first insulating area, when the first substrate is bonded to the second substrate.

According to an exemplary embodiment of the disclosure, a liquid crystal display comprises a display panel that includes a first pixel defined by a first gate line and a first data line and a second pixel defined by a second gate line and a second data line, a first driver that drives the first pixel, a second driver that drives the second pixel and an operation controller that controls the first driver and the second driver, wherein the first gate line and the second gate line overlap each other.

The first pixel may be defined by a first substrate, the second pixel may be defined by a second substrate, and the first substrate and the second substrate face each other.

The overlapped gate lines may transmit a first gate signal to the first pixel in a first region, and a second gate signal to the second pixel in a second region.

The first substrate may include a first switching element and first electric field forming electrodes that form a first electric field based on on/off signals received from the first switching element, and the second substrate may include a second switching element and second electric field forming electrodes that form a second electric field based on on/off signals received from the second switching element.

The first switching element may at least partially overlap the second switching element.

A light blocking member may be disposed in an area where the first switching element overlaps the second switching element.

DETAILED DESCRIPTION OF EXEMPLARY EMBODIMENTS

Hereinafter, embodiments of the present disclosure will be described with reference to the accompanying drawings.

Figure 1:
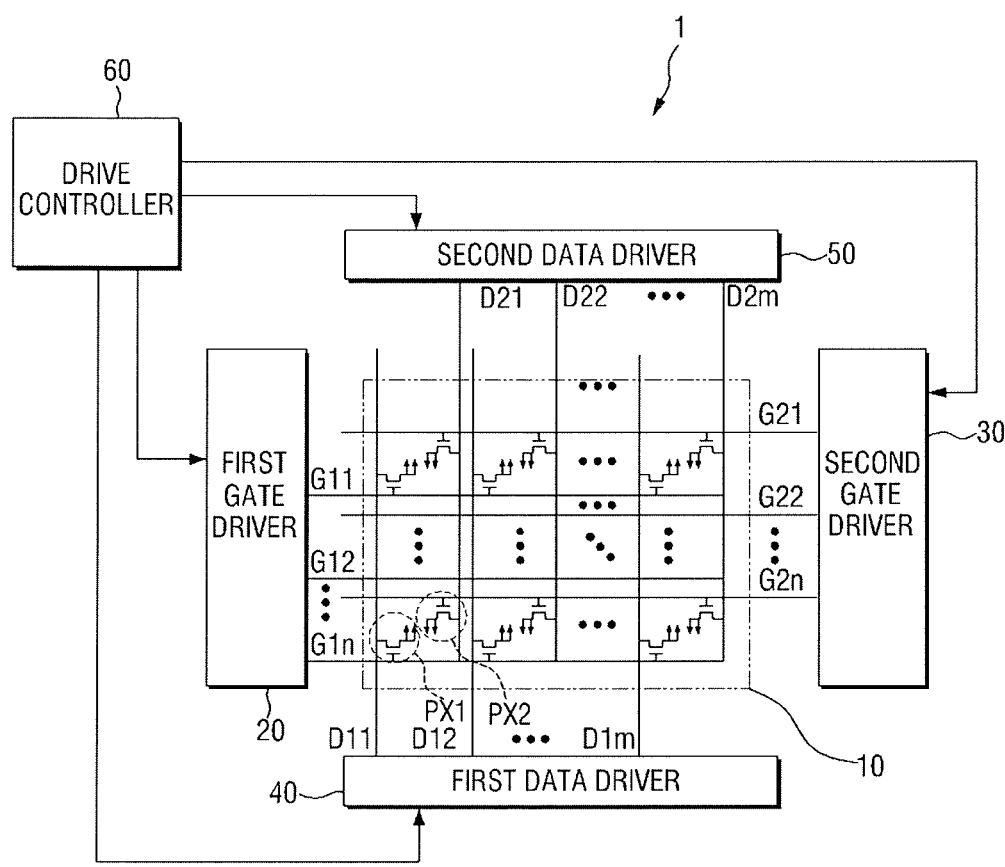
FIG. 1 is a block diagram of a liquid crystal display according to an embodiment of the present disclosure.

FIG. 1 is a block diagram of a liquid crystal display according to an embodiment of the present disclosure.

Referring to FIG. 1, a liquid crystal display 1 according to an embodiment of the present disclosure includes a display panel 10, a first gate driver 20, a second gate driver 30, a first data driver 40, a second data driver 50, and a drive controller 60.

The display panel 10 includes a plurality of pixels to display an image. The plurality of pixels includes a plurality of first pixels PX1 defined by a plurality first gate lines G11, G12, . . . , G1$n$ and a plurality of first data lines D11, D12, . . . , D1$m$ and a plurality of second pixels PX2 defined by a plurality of second gate lines G21, G22, . . . , G2$n$ and a plurality of second data lines D21, D22, . . . , D2$m$. The structure of the display panel 10 will be explained in more detail below with reference to FIGS. 2 to 7.

The first gate driver 20 receives a control signal from the drive controller 60 to drive the first gate lines G11, G12, . . . , G1$n$.

The second gate driver 30 receives a control signal from the drive controller 60 to drive the second gate lines G21, G22, . . . , G2$n$.

The first data driver 40 receives a control signal from the drive controller 60 to drive the first data lines D11, D12, . . . , D1$m$.

The second data driver 50 receives a control signal from the drive controller 60 to drive the second data lines D21, D22, . . . , D2$m$.

The drive controller 60 enables an image to be displayed on the display panel 10 by generating and applying control signals for controlling the first gate driver 20, the second gate driver 30, the first data driver 40 and the second data driver 50 according to an externally received image control signal.

Figure 2:
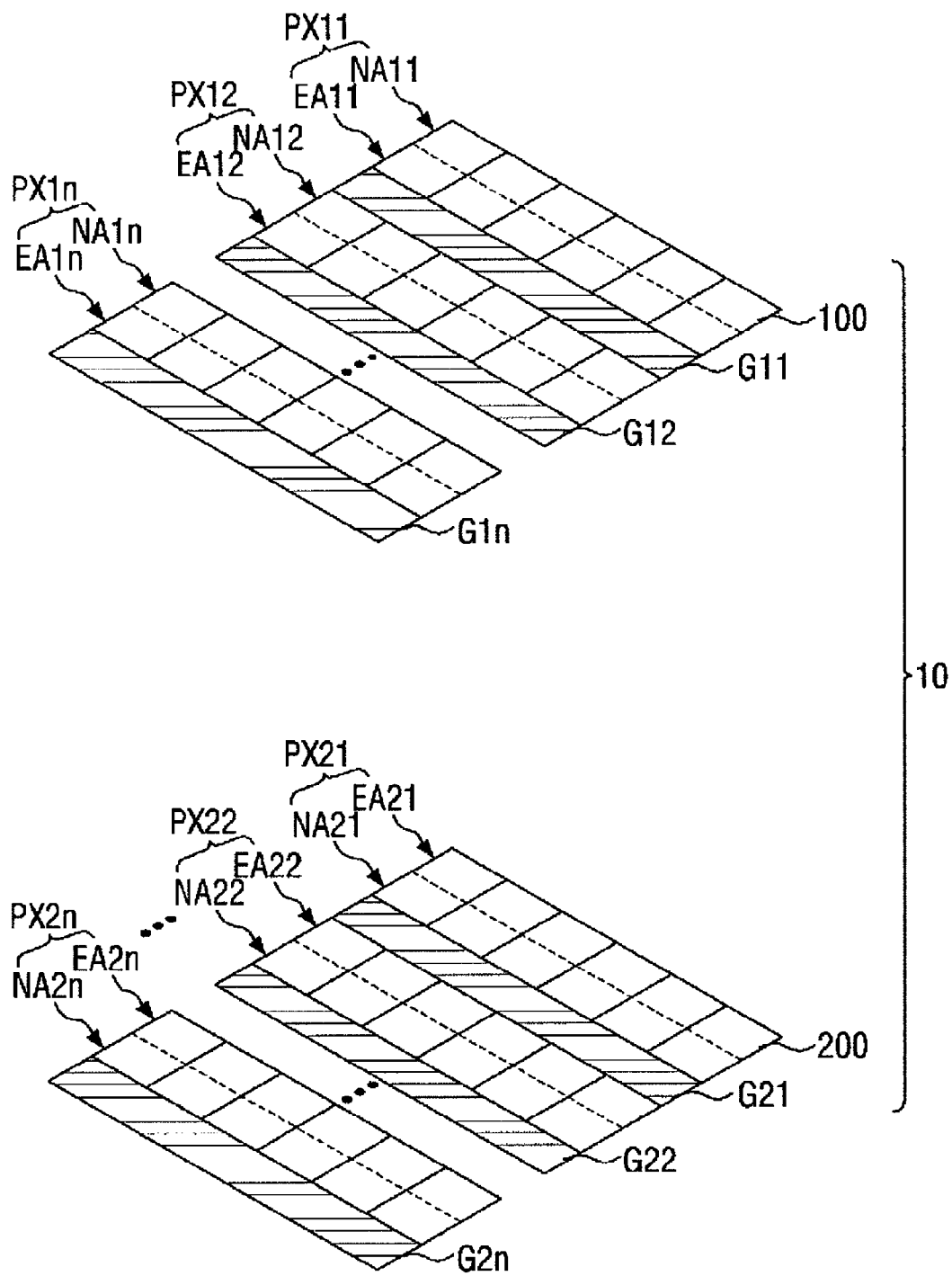
FIG. 2 is a plan view of a first substrate and a second substrate of the display panel of FIG. 1.
Figure 3:
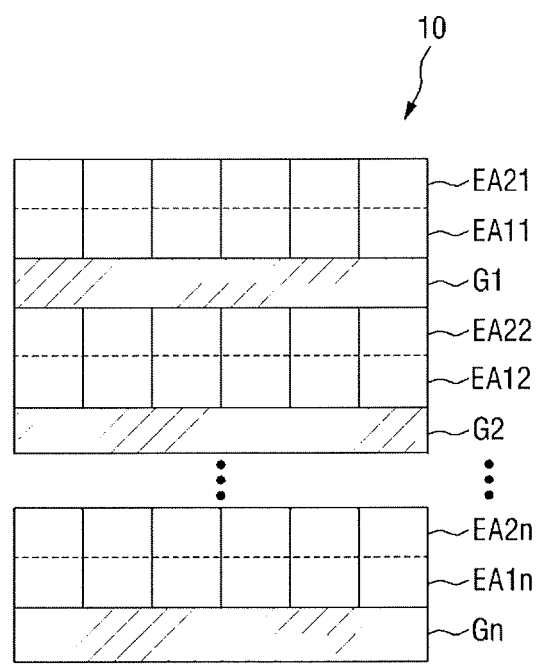
FIG. 3 is a plan view of a display panel when the first substrate and the second substrate are bonded to each other.

FIG. 2 is a plan view of a first substrate and a second substrate of the display panel of FIG. 1. FIG. 3 is a plan view of a display panel when the first substrate and the second substrate are bonded to each other.

First, referring to FIG. 2, the display panel 10 includes a first substrate 100 and a second substrate 200 facing the first substrate 100.

According to an embodiment, the first substrate 100 includes a plurality of first pixels PX11, PX12, . . . , PX1$n$ and the plurality of first gate lines G11, G12, . . . , G1$n$ arranged to define the first pixels PX11, PX12, . . . , PX1$n$.

According to an embodiment, the plurality of first pixels PX11, PX12, . . . , PX1$n$ include a plurality of first electric field areas EA11, EA12, . . . , EA1$n$ which can rearrange liquid crystal molecules of a liquid crystal layer and a plurality of first insulating areas NA11, NA12, . . . , NA1$n$ where no electrical elements are formed.

According to an embodiment, the plurality of first gate lines G11, G12, . . . , G1$n$ generally extend in a horizontal direction to transmit a first gate signal to each of the first pixels PX11, PX12, . . . , PX1$n$.

According to an embodiment, the second substrate 200 includes a plurality of second pixels PX21, PX22, . . . , PX2$n$ and the plurality of second gate lines G21, G22, . . . , G2n arranged to define the second pixels PX21, PX22, . . . , PX2n.

According to an embodiment, the plurality of second pixels PX21, PX22, . . . , PX2n include a plurality of second electric field areas EA21, EA22, . . . , EA2n which can rearrange liquid crystal molecules of a liquid crystal layer, and a plurality of second insulating areas NA21, NA22, . . . , NA2n in which no electrical elements are formed. In this case, the plurality of second electric field areas EA21, EA22, . . . , EA2n are arranged to correspond to the plurality of first insulating areas NA11, NA12, . . . , NA1n of the plurality of first pixels PX11, PX12, . . . , PX1n.

According to an embodiment, the plurality of second gate lines G21, G22, . . . , G2n generally extend in the horizontal direction to transmit a second gate signal to each of the second pixels PX21, PX22, . . . , PX2n. In this case, the plurality of second gate lines G21, G22, . . . , G2n are arranged to correspond to the plurality of first gate lines G11, G12, . . . , G1n.

When the display panel 10 is formed by bonding the first substrate 100 to the second substrate 200, as shown in FIG. 3, the plurality of gate lines G1, G2, . . . , Gn and the plurality of electric field areas EA1, EA2, . . . , EAn defined by the plurality of gate lines G1, G2, . . . , Gn may be arranged.

Since the gate lines are arranged to overlap, the overlapped gate lines can be seen as one line. For example, the first gate line G11 and the second gate line G21 can be seen as one gate line G1.

According to an embodiment, the plurality of electric field areas EA1, EA2, . . . , EAn may be configured such that the plurality of first electric field areas EA11, EA12, . . . , . . . , EA1n on the first substrate 100 and the plurality of second electric field areas EA21, EA22, . . . , EA2n on the second substrate 200 can be divided into upper and lower sides. In other words, when the first substrate 100 is bonded to the second substrate 200, the second electric field areas EA21, EA22, . . . , EA2n are arranged in a region corresponding to the first insulating areas NA11, NA12, . . . , NA1n of the first substrate 100, and the first electric field areas EA11, EA12, . . . , EA1n are positioned in a region corresponding to the second insulating areas NA21, NA22, . . . , NA2n of the second substrate 200.

Accordingly, in the display panel 10 according to an embodiment of the present disclosure, the plurality of gate lines G1, G2, . . . , Gn may apply gate signals to not only the first electric field areas EA11, EA12, . . . , EA1n but also the second electric field areas EA21, EA22, . . . , EA2n. This operation will be described below with reference to FIG. 4.

Figure 4:
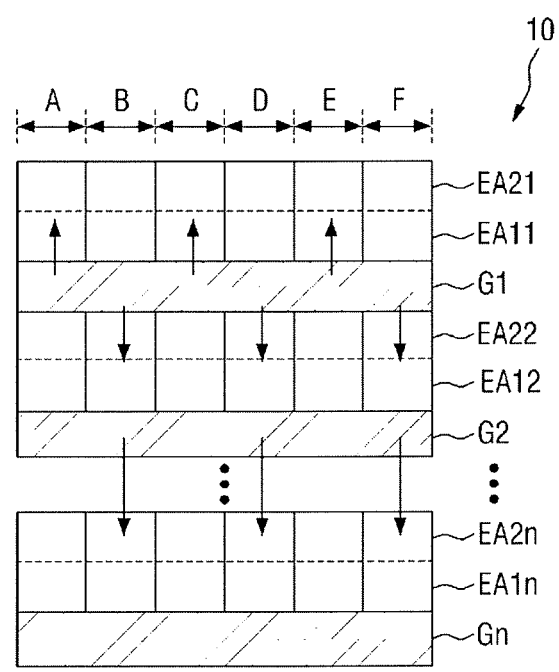
FIG. 4 illustrates the operation of a display panel according to an embodiment of the present disclosure.

FIG. 4 an operation of a display panel according to an embodiment of the present disclosure.

For clarity of exposition, FIG. 4 will be described in conjunction with one gate line G1. One gate line G1 can apply a gate signal to the first electric field area EA11 formed in a region A on the first substrate 100, apply a gate signal to the second electric field area EA22 formed in a region B on the second substrate 200, and apply a gate signal to the first electric field area EA11 formed in a region C on the first substrate 100. In other words, the gate line G1 of the display panel 10 can apply a gate signal alternately to the first electric field area, i.e., an upper electric field area, formed on the first substrate 100 and the second electric field area, i.e., a lower electric field area, formed on the second substrate 200.

As described above, in the liquid crystal display 1 according to an embodiment of the present disclosure, the plurality of first electric field areas EA11, EA12, . . . , EA1n and the plurality of second electric field areas EA21, EA22, . . . , EA2n are alternately arranged on the first substrate 100 and the second substrate 200, respectively. Accordingly, it is possible to implement a high resolution and improve an aperture ratio. In the liquid crystal display 1 according to an embodiment of the present disclosure, by forming a light blocking member for every two pixels, the aperture ratio is improved compared a conventional liquid crystal display. A more detailed description thereof will be given below with reference to FIGS. 5 to 7.

Figure 5:
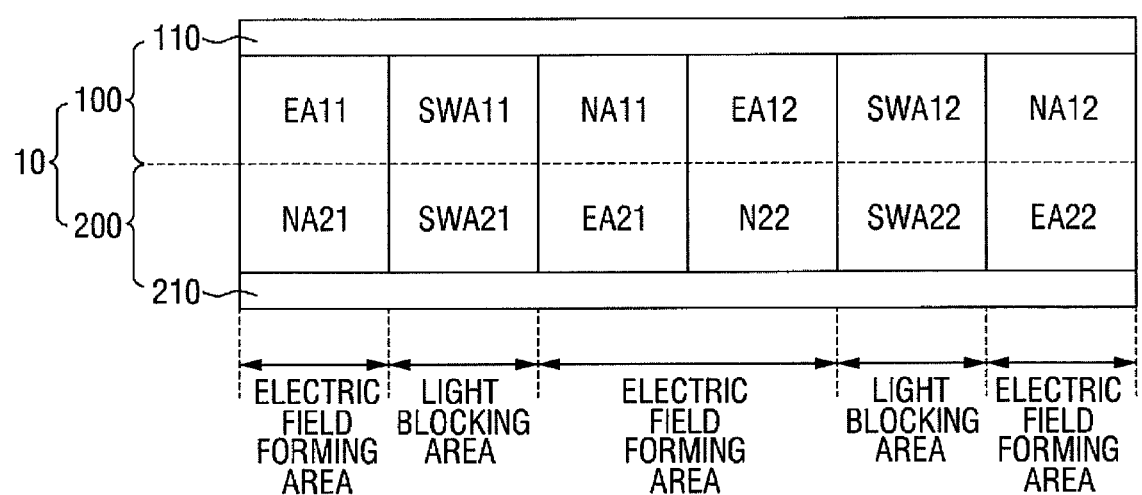
FIG. 5 is a cross-sectional view of a display panel according to an embodiment of the present disclosure.

FIG. 5 is a cross-sectional view of a display panel according to an embodiment of the present disclosure.

Referring to FIG. 5, each of the first substrate 100 and the second substrate 200 of the display panel 10 according to an embodiment of the present disclosure includes an electric field area EA where electrodes are formed that can rearrange the liquid crystal molecules, a switching area SWA where a switching element, such as a thin film transistor (TFT), is formed to apply a voltage to the electric field forming electrodes, and an insulating area NA where insulating materials are formed.

According to an embodiment, the first substrate 100 is configured so that the first electric field area EA11 (EA12), the first switching area SWA11 (SWA12) and the first insulating area NA11 (NA12) are arranged sequentially on a first insulating substrate 110.

According to an embodiment, the second substrate 200 is configured so that the second insulating area NA21 (NA22), the second switching area SWA21 (SWA22) and the second electric field area EA21 (EA22) are arranged sequentially on a second insulating substrate 210. In this case, as described above, the first electric field areas EA11 and EA12 of the first substrate 100 correspond to the second insulating areas NA21 and NA22 of the second substrate 200, and the second electric field areas EA21 and EA22 of the second substrate 200 correspond to the first insulating areas NA11 and NA12 of the first substrate 100. In addition, the first switching areas SWA11 and SWA12 on the first substrate 100 overlap the second switching areas SWA21 and SWA22 on the second substrate 200.

Accordingly, the display panel 10 of the liquid crystal display 1 according to an embodiment of the present disclosure is configured so that, as shown in FIG. 5, the first electric field area EA11, an overlapping switching area, the second electric field area EA21, the first electric field area EA12, an overlapping switching area, and the second electric field area EA22 are arranged sequentially. Further, the first electric field areas EA11 and EA12 and the second electric field areas EA21 and EA22 are electric field forming areas in which electric field forming electrodes such as pixel and common electrodes are disposed. In other words, the display panel 10 of the liquid crystal display 1 according to the embodiment of the present disclosure is configured so that an electric field forming area is positioned between any two overlapping switching area. The electric field forming area according to the embodiment is configured so that the first electric field area and the second electric field area are positioned side by side. Further, a light blocking member according to the embodiment is formed in the overlapping switching area. That is, the overlapping switching area is a light blocking area.

Accordingly, in the liquid crystal display 1 according to an embodiment of the present disclosure, one light blocking area is disposed per two electric field areas. Thus, an aperture ratio can be improved as compared to a case where a light blocking member is formed for each pixel, that is, a case in which one light blocking area is disposed per electric field area.

Figure 6:
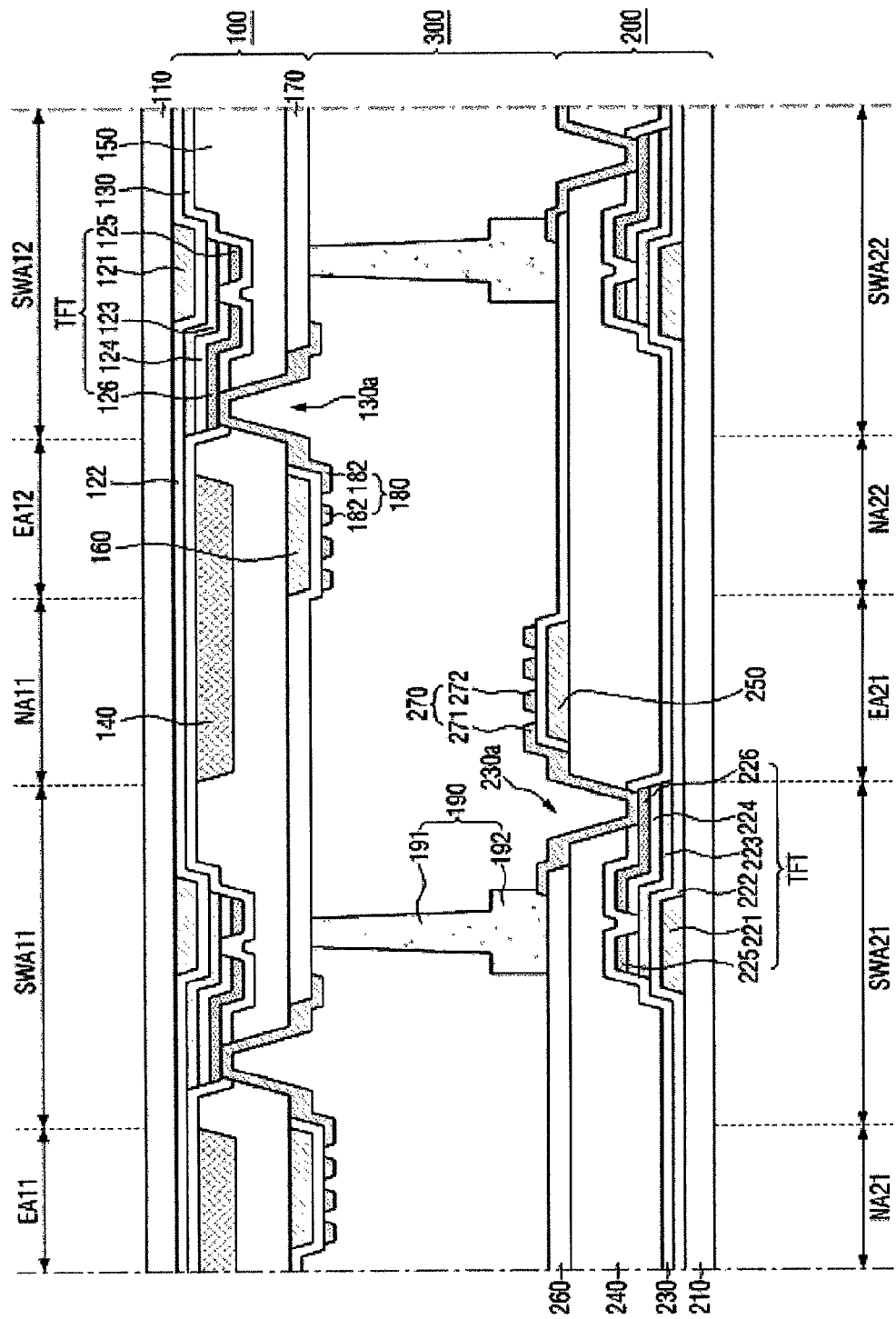
FIGS. 6 and 7 are cross-sectional views of a structure of a display panel of FIG. 5.
Figure 7:
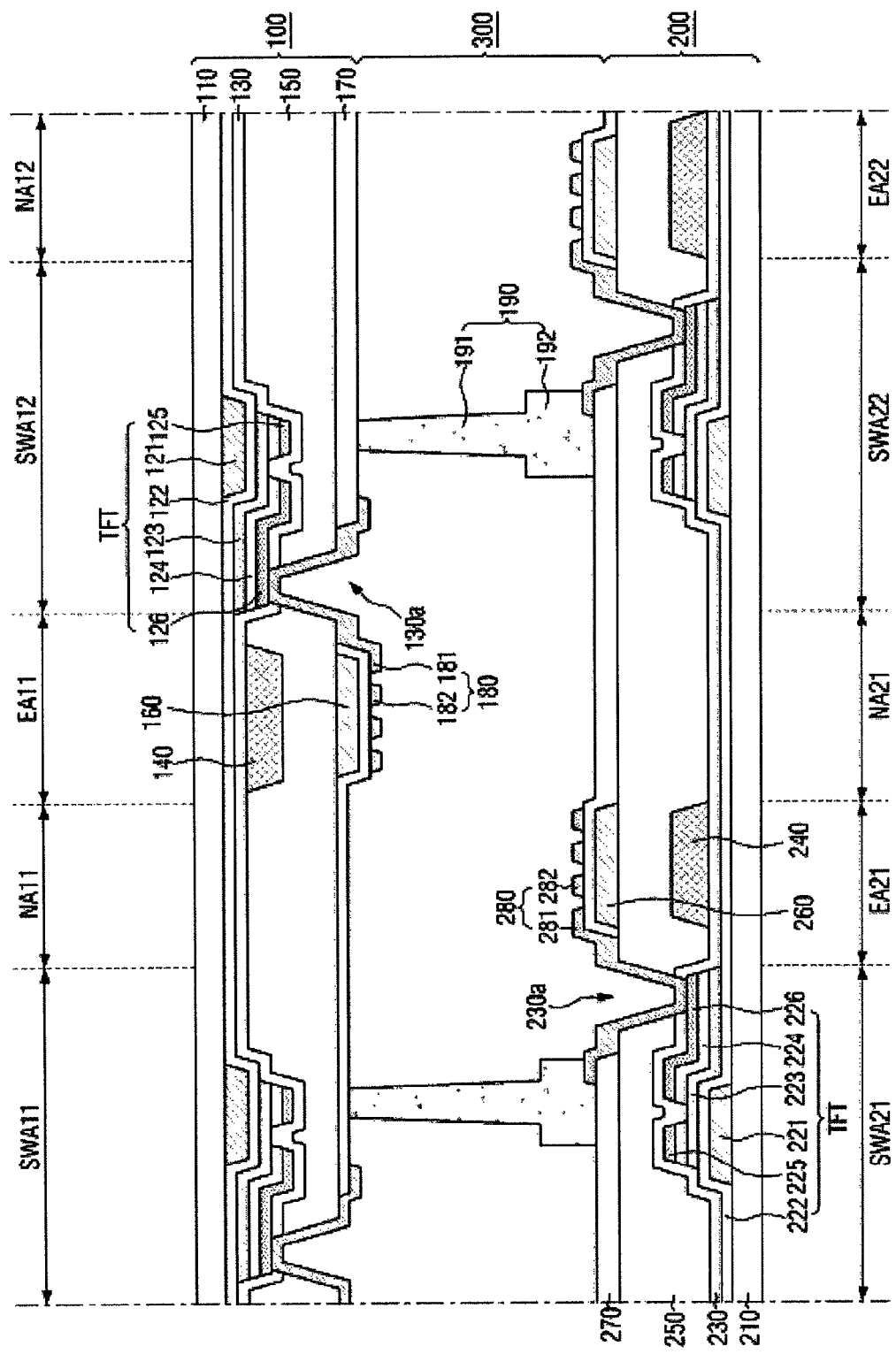

FIGS. 6 and 7 are cross-sectional views of a structure of a display panel of FIG. 5.

First, referring to FIG. 6, the display panel 10 of the liquid crystal display 1 according to an embodiment of the present disclosure includes the first substrate 100, the second substrate 200 facing the first substrate 100, and a liquid crystal layer 300 interposed between the first substrate 100 and the second substrate 200.

According to an embodiment, the first substrate 100 includes a first insulating substrate 110 formed of an insulating material such as transparent glass, quartz, ceramic, silicon, or transparent plastic.

A first gate electrode 121 is disposed on the first insulating substrate 110. According to an embodiment, the first gate electrode 121 is included in the first gate lines G11, G12, . . . , G1n. The first gate electrode 121 can be provided with a gate voltage which is transmitted through the first gate lines G11, G12, . . . , G1n. The first gate electrode 121 may be formed of, e.g., an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), titanium (Ti), tantalum (Ta), etc. Further, the first gate electrode 121 may have a multilayer structure that includes two conductive films of different physical properties. For example, one conductive film can be made of an aluminum-based metal, a silver-based metal, a copper-based metal, etc., and the other conductive film can be made of a molybdenum-based metal, chromium, titanium, tantalum, etc. Exemplary combinations include a lower chromium film and an upper aluminum film, and a lower aluminum film and an upper molybdenum film. However, embodiments of the present disclosure are not limited thereto, and the first gate electrode may be formed of various other metals and conductors.

According to an embodiment, a first gate insulating film 122 is disposed on the first gate electrode 121. The first gate insulating film 122 can insulate the first gate electrode 121 on the lower side from a first source electrode 125 and a first drain electrode 126 on the upper side. The first gate insulating film 122 may be formed of, e.g., silicon nitride (SiNx) or silicon oxide (SiO$_2$).

According to an embodiment, a first semiconductor layer 123 is disposed on the first gate insulating film 122. At least a portion of the first semiconductor layer 123 overlaps the first gate electrode 121. The first semiconductor layer 123, together with the first gate electrode 121, the first source electrode 125 and the first drain electrode 126, forms a thin film transistor (TFT), i.e., the first switching areas SWA11 and SWA12. The first semiconductor layer 123 may be formed of, e.g., hydrogenated amorphous silicon or polycrystalline silicon. FIG. 6 illustrates a case in which the first semiconductor layer 123 has a linear shape, but embodiments of the disclosure are not limited thereto, and the first semiconductor layer may have various other shapes.

According to an embodiment, a first ohmic contact layer 124 is disposed on the first semiconductor layer 123. The first ohmic contact layer 124 is disposed between the first semiconductor layer 123 on the lower side and the first source electrode 125 and the first drain electrode 126 on the upper side and can reduce the contact resistance. The first ohmic contact layer 124 may be formed of, e.g., n+ hydrogenated amorphous silicon doped with a high concentration of n type impurities. FIG. 6 illustrates a case in which the first ohmic contact layer 124 has a linear shape similar to the first semiconductor layer 123, but embodiments of the disclosure are not limited thereto, and the first ohmic contact layer may have various shapes. However, the first ohmic contact layer 124 has the same shape as the first semiconductor layer 123.

According to an embodiment, the first source electrode 125 and the first drain electrode 126 are disposed on the first ohmic contact layer 124. The first source electrode 125 and the first drain electrode 126 are included in the first data lines D11, D12, . . . , D1m shown in FIG. 1. The first source electrode 125 receives a data voltage through the first data lines D11, D12, . . . , D1m, and the thin film transistor (TFT) turns on when a gate-on voltage is received by the first gate electrode 121. When the thin film transistor (TFT) turns on, the data voltage provided to the first source electrode 125 is transmitted to the first drain electrode 126, and the data voltage is charged to a first pixel electrode 180 connected to the first drain electrode 126. The first source electrode 125 and the first drain electrode 126 may be formed of a material similar to that of the first gate electrode 121, such as aluminum, silver, copper, molybdenum, chromium, titanium, tantalum, or an alloy thereof. The first source electrode 125 is disposed to overlap the first gate electrode 121. The first drain electrode 126 is disposed so that at least a portion thereof overlaps the first gate electrode 121, and is spaced apart from the first source electrode 125. Since the first source electrode 125 and the first drain electrode 126 are spaced apart from each other, the first ohmic contact layer 124 can be configured such that a portion in contact with the first source electrode 125 is spaced apart from a portion in contact with the first drain electrode 126, and an upper portion of the first semiconductor layer 123 is exposed between the first source electrode 125 and the first drain electrode 126.

According to an embodiment, a first-first protection layer 130 is disposed on the first source electrode 125, the first drain electrode 126, the partially exposed portion of the first semiconductor layer 123, and the first gate insulating film 122. The first-first protection layer 130 includes a first contact hole 130a that exposes an upper portion of the first drain electrode 126 so as to be electrically connected to the first pixel electrode 180. The first-first protection layer 130 may be formed of, for example, an inorganic material such as silicon nitride or silicon oxide, or a material such as a-Si:C:O or a-Si:O:F formed by plasma enhanced chemical vapor deposition (PECVD).

According to an embodiment, a first color filter 140 is disposed on the first-first protection layer 130. Further, the first color filter 140 is disposed in an area that overlaps the first pixel electrode 180 and a second pixel electrode 270. In other words, the first color filter 140 extends from the first electric field area EA12 to the first insulating area NA11 of the first substrate 100. This is because the first color filter 140 is disposed on only (i.e., first substrate 100) of the first substrate 100 and the second substrate 200. The first color filter 140 includes a red (R) filter, a green (G) filter, and a blue (B) filter.

According to an embodiment, a first organic layer 150 is disposed on the first color filter 140. The first organic layer 150 covers the first color filter 140 and planarizes a stepped portion of the first color filter 140 to eliminate exposed portions. The first organic layer 150 includes the first contact hole 130a that exposes a portion of the first drain electrode 126. In other words, the first contact hole 130a is formed through the first-first protection layer 130 and the first organic layer 150 to expose a portion of the first drain electrode 126. The first organic layer 150 may be formed of a photosensitive material that can be planarized. In addition, the first color filter 140 may be disposed on any one of the first substrate 100 and the second substrate 200. Although FIG. 6 illustrates a case in which the first color filter 140 is disposed on the first substrate 100, the color filter may also be disposed on the second substrate 200.

According to an embodiment, a first common electrode 160 and a first-second protection layer 170 are disposed on the first organic layer 150.

According to an embodiment, the first common electrode 160 is disposed on the first organic layer 150 to overlap the first color filter 140. The first common electrode 160 receives a common voltage to form the first electric field areas EA11 and EA12 together with the first pixel electrode 180. The first common electrode 160 may be formed of a transparent conductive material such as a polycrystalline, a single crystalline or an amorphous indium tin oxide (ITO) or indium zinc oxide (IZO).

According to an embodiment, the first-second protection layer 170 is disposed on the first organic layer 150 of the first switching areas SWA11 and SWA12 and the first organic layer 150 and the first common electrode 160 of the first electric field areas EA11 and EA12.

The first-second protection layer 170 includes the first contact hole 130a that exposes a portion of the first drain electrode 126. In particular, the first-second protection layer 170 insulates the first common electrode 160 from the first pixel electrode 180 in the first electric field areas EA11 and EA12. Although FIG. 6 illustrates the first-second protection layer 170 as exposing a portion of the first organic layer 150, embodiments are not limited thereto and the first-second protection layer 170 may have various other shapes. The first-second protection layer 170 may be formed of an inorganic insulating material such as silicon nitride and silicon oxide.

According to an embodiment, the first pixel electrode 180 is disposed on the first-second protection layer 170 and along the inner sidewall of the first contact hole 130a and an exposed portion of the first drain electrode 126. As described above, the first pixel electrode 180 forms the first electric field areas EA11 and EA12 together with the first common electrode 160 to rearrange liquid crystal molecules in the liquid crystal layer 300. When the data voltage charged through the first drain electrode 126 is applied to the first pixel electrode 180, the first electric field areas EA11 and EA12 form in a direction toward the first common electrode 160 on the lower side. The first pixel electrode 180 may be formed of a transparent conductive material such as a polycrystalline, a single crystalline or an amorphous indium tin oxide (ITO) or indium zinc oxide (IZO). The first pixel electrode 180 includes a first main pixel electrode 181 and a plurality of first sub-pixel electrodes 182 formed in various shapes such as a rectangle, a closed curve or a curved line segment.

According to an embodiment, a light blocking member 190 is disposed between the liquid crystal layer 300 and the first substrate 100, that is, in an area corresponding to the first switching areas SWA11 and SWA12. More specifically, the light blocking member 190 is disposed in the area where the first gate electrode 121 and a second gate electrode 221 overlap each other. The light blocking member 190 is disposed on the first-second protection layer 170 of the first substrate 100, and on a second-second protection layer 260 of the second substrate 200, which will be described below.

According to an embodiment, the light blocking member 190 includes a column spacer 191 for maintaining a cell gap and a black matrix (BM) 192 for blocking light leakage from the liquid crystal display 1. More specifically, the column spacer 191 is disposed on the first-second protection layer 170 of the first substrate 100, and the black matrix 192 is disposed on the second-second protection layer 260 of the second substrate 200. The column spacer 191 and the black matrix 192 are integrally formed of the same material. In this case, the black matrix 192 is disposed to correspond to the second gate electrode 221. The light blocking member 190 may be formed of a black organic polymer material that includes a black dye or pigment, or may include a metal or metal oxide such as chromium and chromium oxide. FIG. 6 illustrates a case in which the light blocking member 190 includes the integrally formed column spacer 191 and the black matrix 192, but embodiments of the present disclosure are not limited thereto. For example, the black matrix 192 may be disposed in an area corresponding to the gate electrode on any of the first substrate 100 and the second substrate 200, and the column spacer 191 may be disposed separately from the black matrix 192.

According to an embodiment, the second substrate 200 includes a second insulating substrate 210 formed of an insulating material such as transparent glass, quartz, ceramic, silicon, or transparent plastic.

According to an embodiment, the second gate electrode 221 is disposed on the second insulating substrate 210. The second gate electrode 221 is included in the second gate lines G21, G22, . . . , G2n. The second gate electrode 221 is provided with a gate voltage received through the second gate lines G21, G22, . . . , G2n. The second gate electrode 221 may be formed of, e.g., an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), titanium (Ti), tantalum (Ta), etc. Further, the second gate electrode 221 may have a multilayer structure that includes two conductive films of different physical properties. For example, one conductive film may include an aluminum-based metal, a silver-based metal, a copper-based metal, etc., and the other conductive film may be made of a molybdenum-based metal, chromium, titanium, tantalum, etc. Exemplary combinations include a lower chromium film and an upper aluminum film, and a lower aluminum film and an upper molybdenum film. However, embodiments of the present disclosure are not limited thereto, and the second gate electrode may be formed of various other metals and conductors.

According to an embodiment, a second gate insulating film 222 is disposed on the second gate electrode 221. The second gate insulating film 222 insulates the second gate electrode 221 on the lower side from a second source electrode 225 and a second drain electrode 226 on the upper side. The second gate insulating film 222 may be formed of, e.g., silicon nitride (SiNx) or silicon oxide ($SiO_2$).

According to an embodiment, a second semiconductor layer 223 is disposed on the second gate insulating film 222. At least a portion of the second semiconductor layer 223 overlaps the second gate electrode 221. The second semiconductor layer 223, together with the second gate electrode 221, the second source electrode 225 and the second drain electrode 226, forms a thin film transistor (TFT), i.e., the second switching areas SWA21 and SWA22. The second semiconductor layer 223 may be formed of, e.g., hydrogenated amorphous silicon or polycrystalline silicon. FIG. 6 illustrates a case in which the second semiconductor layer 223 has a linear shape, but embodiments of the disclosure are not limited thereto, and the second semiconductor layer may have various other shapes.

According to an embodiment, a second ohmic contact layer 224 is disposed on the second semiconductor layer 223. The second ohmic contact layer 224 is disposed between the second semiconductor layer 223 on the lower side and the second source electrode 225 and the second drain electrode 226 on the upper side and reduces the contact resistance. The second ohmic contact layer 224 may be formed of, e.g., n+ hydrogenated amorphous silicon doped with a high concentration of n type impurities. FIG. 6 illustrates a case in which the second ohmic contact layer 224 has a linear shape similar to the second semiconductor layer 223, but embodiments of the disclosure are not limited thereto, and the second ohmic contact layer may have various other shapes. However, the second ohmic contact layer 224 has the same shape as the second semiconductor layer 223.

According to an embodiment, the second source electrode 225 and the second drain electrode 226 are disposed on the second ohmic contact layer 224. The second source electrode 225 and the second drain electrode 226 are included in the second data lines D21, D22, . . . , D2m shown in FIG. 1. The second source electrode 225 receives a data voltage through the second data lines D21, D22, . . . , D2m, and the thin film transistor (TFT) turns on when a gate-on voltage is received by the second gate electrode 221. When the thin film transistor (TFT) turns on, the data voltage provided to the second source electrode 225 is transmitted to the second drain electrode 226, and the data voltage is charged to the second pixel electrode 270 connected to the second drain electrode 226. The second source electrode 225 and the second drain electrode 226 may be formed of a material similar to that of the second gate electrode 221, such as aluminum, silver, copper, molybdenum, chromium, titanium, tantalum, or an alloy thereof. The second source electrode 225 overlaps the second gate electrode 221. The second drain electrode 226 is disposed such that at least a portion thereof overlaps the second gate electrode 221, and is spaced apart from the second source electrode 225. Since the second source electrode 225 and the second drain electrode 226 are spaced apart from each other, the second ohmic contact layer 224 can be configured so that a portion in contact with the second source electrode 225 is spaced apart from a portion in contact with the second drain electrode 226, and an upper portion of the second semiconductor layer 223 is exposed between the second source electrode 225 and the second drain electrode 226.

According to an embodiment, a second-first protection layer 230 is disposed on the second source electrode 225, the second drain electrode 226, the partially exposed portion of the second semiconductor layer 223, and the second gate insulating film 222. The second-first protection layer 230 includes a second contact hole 230a that exposes an upper portion of the second drain electrode 226 so as to be electrically connected to the second pixel electrode 270. The second-first protection layer 230 may be formed of, for example, an inorganic material such as silicon nitride or silicon oxide, or a material such as a-Si:C:O or a-Si:O:F formed by plasma enhanced chemical vapor deposition (PECVD).

According to an embodiment, a second organic layer 240 is disposed on the second-first protection layer 230. The second organic layer 240 planarizes a stepped portion of the second-first protection layer 230. The second organic layer 240 includes the second contact hole 230a that exposes a portion of the second drain electrode 226. In other words, the second contact hole 230a is formed through the second-first protection layer 230 and the second organic layer 240 to expose a portion of the second drain electrode 226. The second organic layer 240 may be formed of a material that can be planarized.

According to an embodiment, a second common electrode 250 and a second-second protection layer 260 are disposed on the second organic layer 240.

The second common electrode 250 is disposed on the second organic layer 240. The second common electrode 250 receives a common voltage to form the second electric field areas EA21 and EA22 together with the second pixel electrode 270. The second common electrode 250 may be formed of a transparent conductive material such as a polycrystalline, a single crystalline or an amorphous indium tin oxide (ITO) or indium zinc oxide (IZO). FIG. 6 illustrates a case in which the second common electrode 250 is formed on the second organic layer 240, but embodiments of the present disclosure are not limited thereto. For example, the second common electrode 250 may be disposed on the second gate insulating film 222 that overlaps the second pixel electrode 270. If the second common electrode 250 is disposed on the second gate insulating film 222, the second organic layer 240 and the second-second protection layer 260 can be omitted from the configuration of FIG. 6.

The second-second protection layer 260 is disposed on the second organic layer 240 of the second switching areas SWA21 and SWA22 and the second organic layer 240 and the second common electrode 250 of the second electric field areas EA21 and EA22.

According to an embodiment, the second-second protection layer 260 includes the second contact hole 230a that exposes a portion of the second drain electrode 226. In particular, the second-second protection layer 260 insulates the second common electrode 250 from the second pixel electrode 270 in the second electric field areas EA21 and EA22. Although FIG. 6 illustrates that the second-second protection layer 260 exposes a portion of the second organic layer 240, embodiments of the present disclosure are not limited thereto and the second-second protection layer 260 may have various shapes. The second-second protection layer 260 may be formed of an inorganic insulating material such as silicon nitride and silicon oxide.

According to an embodiment, the second pixel electrode 270 is disposed on the second-second protection layer 260 and along the inner sidewall of the second contact hole 230a and an exposed portion of the second drain electrode 226. As described above, the second pixel electrode 270 forms the second electric field areas EA21 and EA22 together with the second common electrode 250 to rearrange liquid crystal molecules in the liquid crystal layer 300. When the data voltage charged through the second drain electrode 226 is applied to the second pixel electrode 270, the second electric field areas EA21 and EA22 forming a direction toward the second common electrode 250 on the lower side. The second pixel electrode 270 may be formed of a transparent conductive material such as a polycrystalline, a single crystalline or an amorphous indium tin oxide (ITO) or indium zinc oxide (IZO). The second pixel electrode 270 includes a second main pixel electrode 271 and a plurality of second sub-pixel electrodes 272 formed in various shapes such as a rectangle, a closed curve or a curved line segment.

According to an embodiment, the liquid crystal layer 300 displays an image by adjusting the amount of transmitted light by arranging the liquid crystal molecules in the liquid crystal layer 300 with the electric field forming electrodes, i.e., the first and second common electrodes 160 and 250 and the pixel electrodes 180 and 270, and the switching element (TFT) formed on each of the first substrate 100 and the second substrate 200.

In the above-described configuration of FIG. 6, since the first color filter 140 is formed on one substrate, namely the first substrate 100, the first electric field area EA12 and the second electric field area EA21, which are arranged side by side with respect to the light blocking member 190, can display the same color because they use the same color filter.

According to embodiments, to display colors, as shown in FIG. 7, a first color filter 140 and a second color filter 240 may be formed on the first substrate 100 and the second substrate 200, respectively. For example, if the first color filter 140 is a red filter, green or blue filter may be provided as the second color filter 240. Since remaining configuration of FIG. 7 is the same as the configuration of FIG. 6, a detailed description of FIG. 7 will be omitted.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made in exemplary embodiments without departing from the spirit and scope of embodiments of the present disclosure as set forth in the following claims.

What is claimed is:

1. A liquid crystal display comprising:
   a first substrate that includes a first switching element and first electric field forming electrodes that form a first electric field based on on/off signals received from the first switching element;
   a second substrate which faces the first substrate and that includes a second switching element and second electric field forming electrodes that forms a second electric field based on on/off signals received from the second switching element;
   a liquid crystal layer interposed between the first substrate and the second substrate; and
   a first color filter disposed on the first substrate and a second color filter disposed on the second substrate,
   wherein the liquid crystal layer includes a first electric field area controlled by the first substrate in which the first electric field is formed, and a second electric field area controlled by the second substrate in which the second electric field is formed,
   wherein the first color filter and the second color filter are disposed to correspond to the first electric field area and the second electric field area, respectively, wherein the first electric field area and the second electric field area display different colors, and
   wherein the first electric field area and the second electric field area are arranged side by side and do not overlap each other.

2. The liquid crystal display of claim 1, wherein the liquid crystal layer comprises:
   a first switching area and a first insulating area, wherein the first insulating area corresponds to a first insulating material disposed on the first substrate that extends from the first electric field forming electrodes to the first switching element, and
   a second switching area and a second insulating area, wherein the second insulating area corresponds to a second insulating material disposed on the second substrate that extends from the second electric field forming electrodes to the second switching element,
   wherein the first switching area, the first electric field area and the first insulating area are defined by the first substrate, and the second switching area, the second electric field area and the second insulating area are defined by the second substrate.

3. The liquid crystal display of claim 2, wherein the first switching area and the second switching area overlap each other.

4. The liquid crystal display of claim 2, wherein the first electric field area is positioned at one side of the first switching area and the first insulating area is positioned at the other side of the first switching area, and
   the second insulating area is positioned at one side of the second switching area and the second electric field area is positioned at the other side of the second switching area.

5. The liquid crystal display of claim 4, wherein the first electric field area corresponds to the second insulating area and the second electric field area corresponds to the first insulating area, when the first substrate is bonded to the second substrate.

6. The liquid crystal display of claim 3, further comprising a light blocking member disposed in an area corresponding to where the first switching area and the second switching area overlap each other.

7. The liquid crystal display of claim 6, wherein the light blocking member comprises:
   a column spacer that maintains a cell gap between the first substrate and the second substrate; and
   a black matrix formed on one of the first substrate or the second substrate.

8. The liquid crystal display of claim 7, wherein the column spacer and the black matrix are integrally formed.

9. The liquid crystal display of claim 1, further comprising a color filter disposed on the first substrate to correspond to the first electric field area and the first insulating area, wherein the first electric field area and the second electric field area display the same color.

10. A liquid crystal display comprising:
    a first substrate that forms a first electric field;
    a second substrate which faces the first substrate and that forms a second electric field;
    a liquid crystal layer interposed between the first substrate and the second substrate; and
    a first color filter disposed on the first substrate and a second color filter disposed on the second substrate,
    wherein the liquid crystal layer includes a first switching area, a first electric field area in which the first electric field is formed, and a first insulating area, and a second switching area, a second electric field area in which the second electric field is formed, and a second insulating area,
    wherein the first color filter and the second color filter are disposed to correspond to the first electric field area and the second electric field area, respectively, wherein the first electric field area and the second electric field area display different colors,
    wherein the first switching area, the first electric field area and the first insulating area are defined by the first substrate, and the second switching area, the second electric field area and the second insulating area are defined by the second substrate,
    wherein the first electric field area and the second electric field area are arranged side by side.

11. The liquid crystal display of claim 10, wherein:
    the first substrate includes a first switching element, first electric field forming electrodes that forms the first electric field in the first electric field area based on on/off signals received from the first switching element, and a first insulating material that extends from the first electric field forming electrodes to the first switching element and that corresponds to the first insulating area, the second substrate includes a second switching element, second electric field forming electrodes that forms the second electric field in the second electric field area based on on/off signals received from the second switching element, and a second insulating material that extends from the second electric field forming electrodes to the second switching element and that corresponds to the second insulating area.

12. The liquid crystal display of claim 11, wherein the first switching area and the second switching area overlap each other, and further comprising a light blocking member disposed in an area corresponding to where the first switching area and the second switching area overlap each other.

13. The liquid crystal display of claim 11, wherein the first electric field area is positioned at one side of the first switching area and the first insulating area is positioned at the other side of the first switching area, the second insulating area is positioned at one side of the second switching area and the second electric field area is positioned at the other side of the second switching area, and the first electric field area corresponds to the second insulating area and the second electric field area corresponds to the first insulating area, when the first substrate is bonded to the second substrate.

\* \* \* \* \*